United States Patent
Djelouah

[11] Patent Number: 5,271,594
[45] Date of Patent: Dec. 21, 1993

[54] SOLAR LAMP STAND

[75] Inventor: Salah Djelouah, Saint Jean de Braye, France

[73] Assignee: Sorleec, Loiret, France

[21] Appl. No.: 812,619

[22] Filed: Dec. 23, 1991

[30] Foreign Application Priority Data

Dec. 27, 1990 [FR] France ............... 90 16315

[51] Int. Cl.⁵ ............................................. F16M 13/00
[52] U.S. Cl. ........................... 248/523; 248/910; 362/183
[58] Field of Search ............... 248/158, 523, 519, 529, 248/522, 910, 346; 362/183, 190, 191, 194, 410, 414, 413

[56] References Cited

U.S. PATENT DOCUMENTS

| 1,754,998 | 4/1930 | Geartts | 248/158 X |
| 2,938,694 | 5/1960 | Craft | 248/158 |
| 3,119,588 | 1/1964 | Keats | 248/910 X |
| 4,281,369 | 7/1981 | Batte | 362/183 |
| 4,609,175 | 9/1986 | Conover | 248/519 |
| 4,751,622 | 6/1988 | Williams | 362/183 |
| 5,145,153 | 9/1992 | Glynn | 248/910 X |
| 5,149,188 | 10/1992 | Robbins | 362/183 |
| 5,152,601 | 10/1992 | Ferng | 362/183 |

FOREIGN PATENT DOCUMENTS

| 2450743 | 4/1976 | Fed. Rep. of Germany | 248/910 |
| 1095643 | 12/1967 | United Kingdom | 362/190 |

*Primary Examiner*—J. Franklin Foss
*Attorney, Agent, or Firm*—Baker & Daniels

[57] ABSTRACT

A stand characterized in that the box is formed by at least one first part (8), and the housinhg (9) of the post is open laterally on the side of the box in order to enable it to be fitted around the post; by a cover (14) which is connected to the box in order to close the lateral opening of the housing (9).

20 Claims, 3 Drawing Sheets

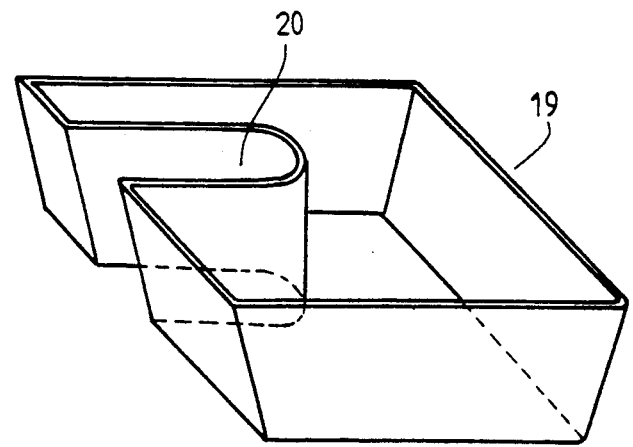
FIG.1D
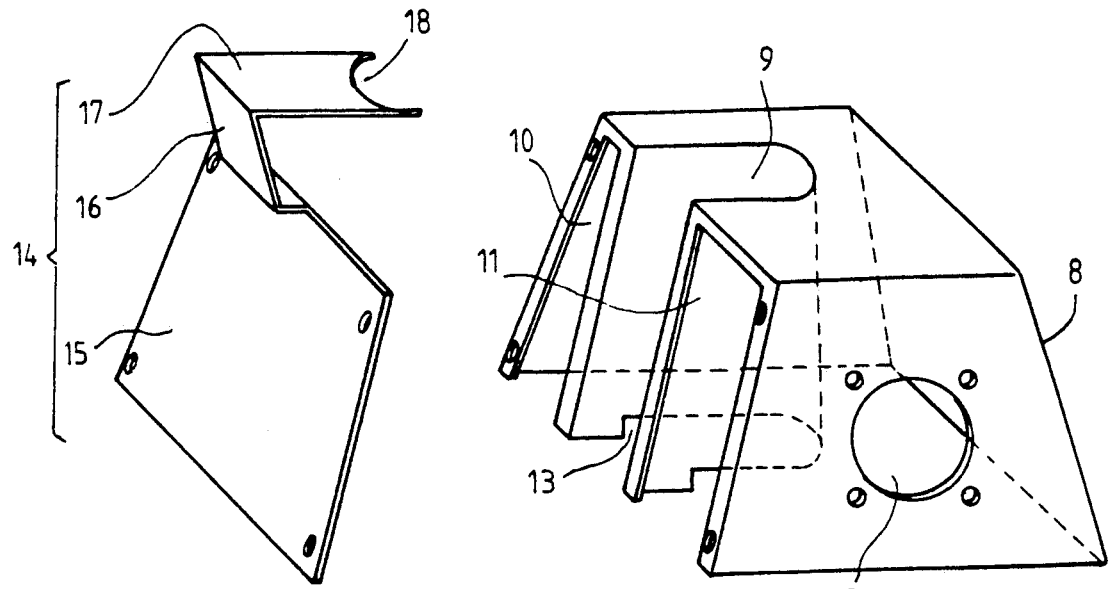
FIG.1C
FIG.1B
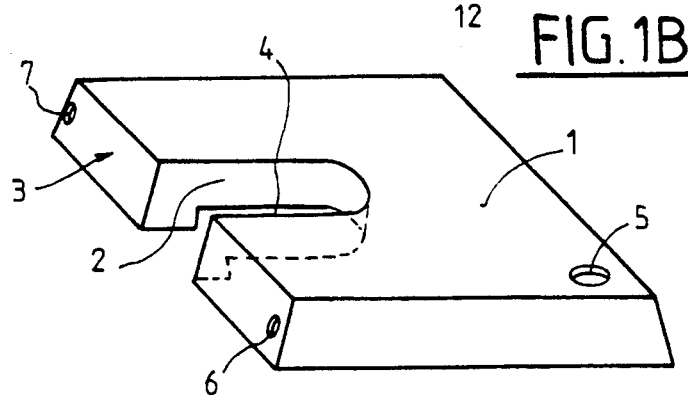
FIG.1A

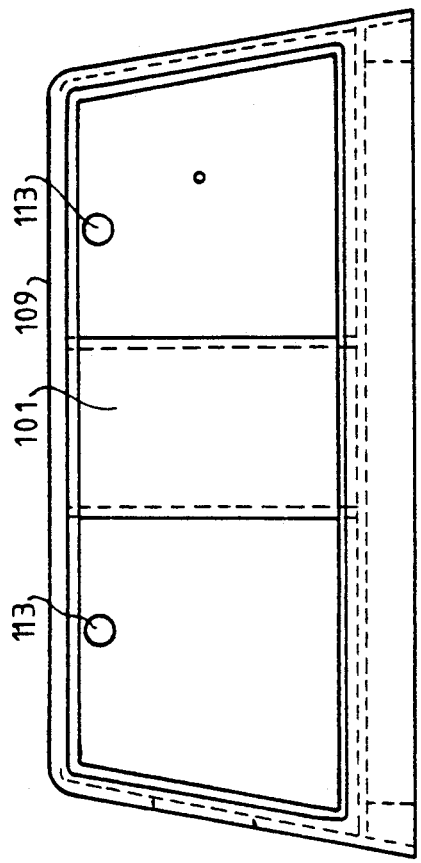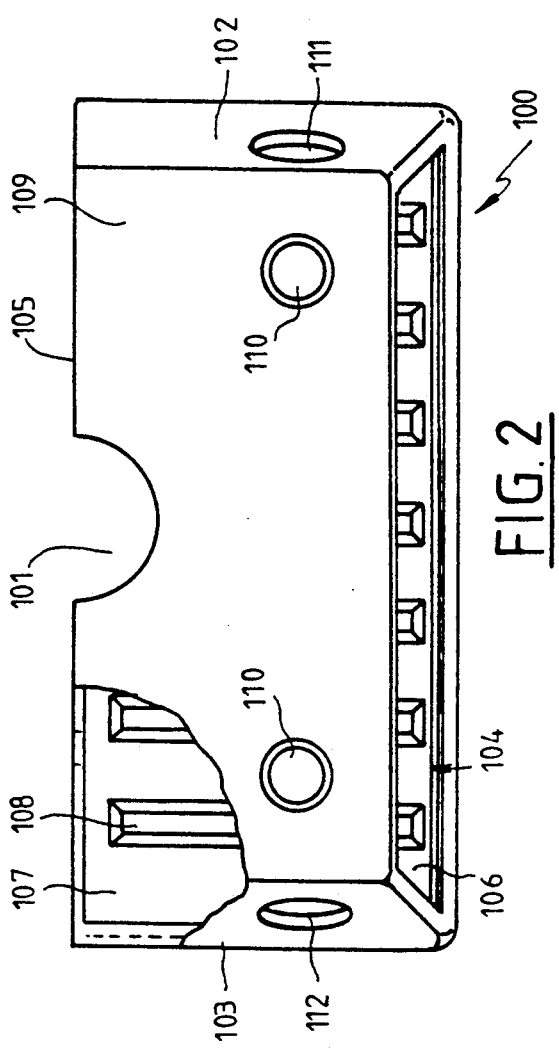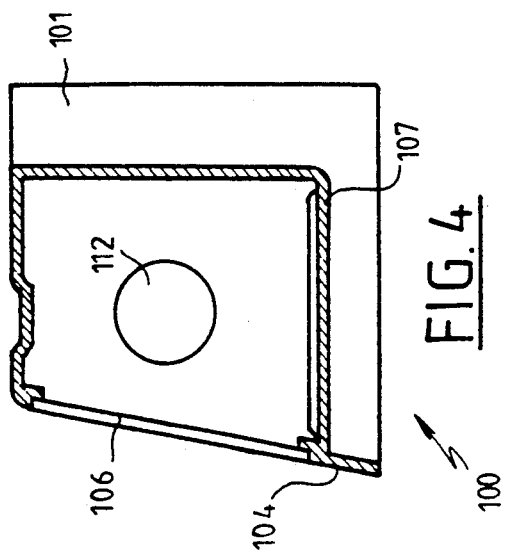

SOLAR LAMP STAND

The present invention relates to a solar lamp stand formed by a box containing the batteries and provided with a housing traversed by the post of the lamp.

Such a lamp is already known and installed.

The difficulties of solar lamps lie in locating the batteries.

The solution which on the face of it is the simplest would consist in installing the batteries in proximity to the solar sensor, at the location where the lighting system is also located. However, this solution is not really viable in practice because of the weight of the batteries and the reinforcement which would be required for the post of the lamp.

Another solution, which on the face of it is simple but must be rejected, would consist in installing the batteries in a housing in the ground. This solution is not possible because of the infiltration of water which would necessarily occur.

The only currently viable solution, and one which moreover is currently used, for the known lamp stand consists in installing the batteries at the foot of the post in a box providing both mechanical protection and protection against acts of vandalism, theft etc.

More precisely, in order currently to install a lamp stand, a concrete block is formed in the ground, on which block a support for the post is fixed. Then the box intended to receive the batteries is put in place, which box forms, where necessary, part of a piece of street furniture, in other words it comprises either containers for plants at its top part, or it forms an element of a bench underframe, etc.

This box, intended to be fixed to the block, comprises a through-passage for the post. When the box is put in place, the post is installed by introducing it through the passage in the box, and the post is then fastened to its fastening means in the concrete block.

This construction has a certain number of disadvantages. Firstly, when installing the lamp, the post must first be introduced through the passage formed in the box. This operation is relatively awkward since the post must be aligned with this orifice (the latter must also be as small as possible), which makes it necessary to lift up the post, to orient it, to align it and then to let it drop through the box, and lastly to fasten it to the block.

Another disadvantage lies in the relative weakness of the fastening of the lower end of the post; this location, to which access is difficult, rusts and weakens the fastening.

Lastly, another disadvantage is that in order to replace a box which has been damaged (for example by a vehicle), the reverse process to the mounting must be followed, in other words the post must be detached, lifted to withdraw it from the box, the box must be removed and replaced by a new box, and the post must then be put back in place.

The object of the present invention is to overcome the disadvantages of the known solutions, and it proposes to create a lamp stand which has a simple construction, can be put in place very simply at the foot of a solar lamp in order to receive the batteries, and which at the same time can, if necessary, serve as a piece of street furniture.

To this end, the invention relates to a lamp stand of the above type, characterised in that the box is formed:

by at least one first part, and the housing of the post is open laterally on the side of the box in order to enable it to be fitted around the post;

by a cover which is connected to the box in order to close the lateral opening of the housing.

The lamp stand according to the invention has the advantage of being put in place after the post of the lamp has been fastened. Under these conditions, the post can be fastened in the conventional manner. It is also possible for the post to be a conventional one which is converted into a solar lamp. Changing a box and replacing it, either because it has been damaged or because the piece of street furniture which it forms must be modified, take place without difficulty and especially without there being any need to remove the post.

According to another feature, the cover also constitutes a second box part for closing and/or completing the openings in the first part of the box.

Constructing the cover either as a box or part of the box which either closes the housing of the post formed in the other part of the box or which completes this housing, the housing of the first part not completely surrounding the post, can be an advantageous solution for reducing the dimensions of each box part or permitting the construction of relatively complicated shapes.

Thus, the first part and the second part of the box forming a cover both comprise a housing receiving at least part of the post, and the joining-together of the two parts of the box closes the housing for the post.

According to another feature, the box has an open bottom, and the stand comprises a base plate to which the box is fastened. The cover can be fastened to the box, or to the box and to the base plate, or just to the base plate. The fastening of the cover is protected by a lock.

According to another feature, the housing of the first part of the box and/or the housing of the cover are in the shape of a U.

According to another feature, the cover surrounds the whole of one side of the box; this cover can also comprise a tongue, the shape of which corresponds to the contour of the piece of furniture which is to fit over the box proper, and it too comprises an opening to enable it to be fitted around the post.

Lastly, the element which is placed on top of the box can consist of two receptacles which engage complementarily on the post.

The present invention will be described below in more detail with the aid of two illustrative embodiments depicted diagrammatically in the attached drawings, in which:

FIG. 1 shows, in exploded perspective view, a first illustrative embodiment of a lamp stand according to the invention, FIG. 1A shows the base plate, FIG. 1B shows the box, FIG. 1C shows the cover, FIG. 1D shows the receptacle placed on top of the box.

FIGS. 2 to 9 show another illustrative embodiment of lamp stands.

FIG. 2 is a top view of a first box part.

FIG. 3 is a front view corresponding to FIG. 2.

FIG. 4 is a side view, in section, corresponding to FIG. 3.

FIG. 5 is a top view of a receptacle intended to be placed on top of the box in FIGS. 2 to 4.

FIG. 6 is a front view of the receptacle in FIG. 5.

FIG. 7 is a view in section, along VII—VII, of FIG. 6,

FIG. 8 is a top view of the receptacle in FIG. 2,

FIG. 9 is a diagrammatic view of the box and of the receptacle, according to FIGS. 2 to 8, placed around a post.

Figure 5:
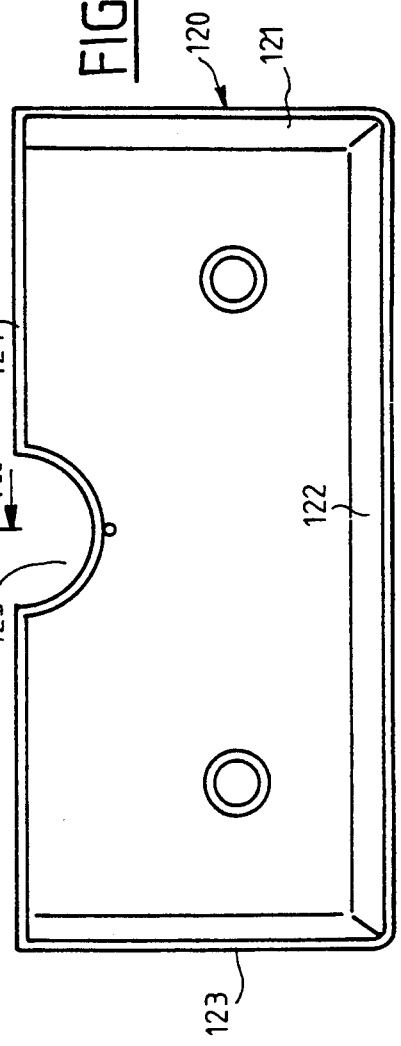
Figure 6:
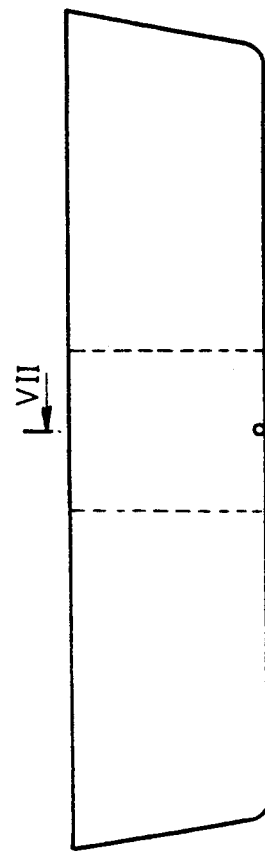
Figure 8:
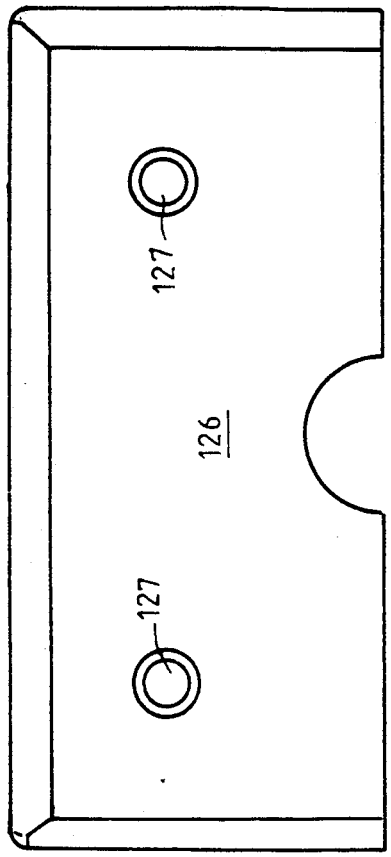
Figure 7:
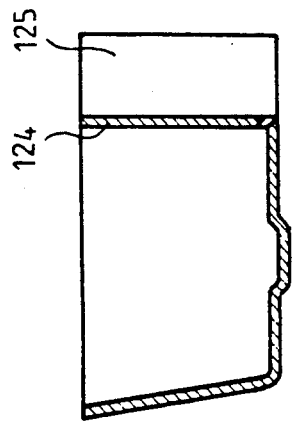

The lamp stand illustrated in FIG. 1 is composed of a base plate 1 in the shape of a truncated pyramid, for example made from plastic. This base plate comprises a housing 2 in the shape of a U open towards the side 3 of the base plate. The base plate also has a recessed portion 4 which can be seen in the housing 2 and enables the base plate to be placed over the rectangular or square plate, not shown, to which the post is fastened.

The base plate 1 also comprises a fastening orifice 5 which enables the base plate to be connected to an anchoring means provided in the ground, and orifices 6 on its side 3 for putting the box and/or the cover in place.

FIG. 1B shows the box or first part of the box 8. This box 8, having the shape of a truncated pyramid adapted to the shape of the base plate 1, is preferably made from plastic like the base plate 1. So as to correspond to the housing 2 of the base plate 1, the box 8 has a housing 9 of the same cross-section as that of the housing 2. On its left-hand face, the box is equipped with two openings 10, 11 which give access to the inside of the box, for example for the insertion, maintenance or replacement of the batteries placed at this location. On a different face, the box 8 is provided with an orifice 12 receiving a ventilation or aeration tube.

Since the box 8 fits over the base plate 1, it likewise comprises, in the region of the lower part of the housing 9, a recessed portion 13 for fitting over the plate for the previously installed post.

FIG. 1C shows the cover 14 of the box 8. This cover is composed of a plate 15 which covers the openings 10, 11 of the box 8 and closes the housing 9. At the same time, this cover is provided with an extension 16 and with a second cover part 17 adapted to the shape of the housing of the receptacle (FIG. 1D) and terminating in a cut-out 18 adapted to the cross-section of the lamp.

FIG. 1D shows the receptacle 19 which is placed on the box 8 and constitutes, for example, a container for plants. This receptacle 19 is also provided with a housing 20 of a shape corresponding to that of the housing 9 of the box 8, and of the housing of the base plate 1.

The upper part of the housing 1 is closed by the part 17 of the cover 14.

The box and its various accessories or supplementary elements are preferably made from plastic.

The second embodiment of the lamp stand, illustrated in FIGS. 2 to 9, differs from the first embodiment mainly in the omission of the base plate, in other words its integration into the box and the construction of the box in two parts which are placed symmetrically around the post.

FIGS. 2, 3, 4 show a first box part 100 comprising a cylindrical housing 101 of semi-circular cross-section which will be completed by the housing of the other box element (not shown). As before, the box has the shape of a truncated pyramid, with three inclined faces 102, 103, 104, and a vertical face 105 situated in the joining plane of the two box parts. The face 104 is open and, through a window 106, allows the bottom 107 to be seen, which bottom 107 is stiffened by moulded ribs 108. The upper face 109 has two cavities 110 which serve as elements for positioning the receptacle part which is to be placed on top of this box part and which is illustrated in FIGS. 5 to 8.

The faces 102, 103 of the box part 100 have orifices 111, 112 receiving grids which serve as means for ventilating the inside of the box. The window 106 is closed by a cover, not shown.

The face 105 (FIG. 3) is provided with two orifices 113, 114 which enable the two box parts 100 to be interconnected after they have been placed around the post, not shown.

The view in cross-section in FIG. 4 demonstrates that the bottom 107 of the box part 100 is situated at a certain height above the lower edge of the box and acts as a base plate so that the batteries do not rest directly on the ground and so that there is no risk of them becoming damp through rainwater or sprayed water.

The receptacle forming part of a container for flowers, which is placed on top of the box part 100, is illustrated in FIGS. 5 to 8. This receptacle 120 comprises inclined walls 121, 122, 123, and a vertical wall 124 placed in the joining plane of two receptacles. The housing 125 for the post is formed in the wall 124.

The bottom 126 of the box is equipped with two positioning studs 127 which are placed in the cavities 110 of the box 100.

Figure 9:
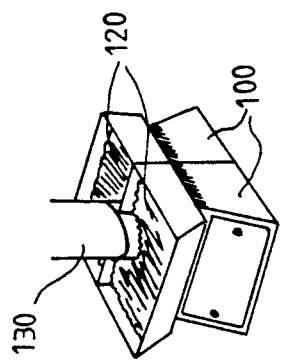

FIG. 9 shows the assembly formed by the two box parts 100, 100 and two receptacle parts 120, 120 placed around a post 130 in order to constitute the stand thereof.

I claim:

1. A solar lamp battery housing for a solar lamp post, the solar lamp battery housing comprising:
    a base defining a battery housing, said base having a lateral opening on a side thereof for receiving a said solar lamp post therein, whereby a said solar lamp post traverses said base; and
    a cover secured to said base for closing said lateral opening of said base and enclosing a said solar lamp post.

2. The solar lamp battery housing according to claim 1, wherein said base includes openings disposed adjacent said lateral opening, said cover closing said openings.

3. The solar lamp battery housing according to claim 1, wherein said base and said cover comprise a housing receiving at least part of a said solar lamp post, and the joining together of said base and said cover completes said housing for a said solar lamp post.

4. The solar lamp battery housing according to claim 1, wherein said base includes an open bottom.

5. The solar lamp battery housing according to claim 1, further comprising a base plate fastened to a bottom of said base.

6. The solar lamp battery housing according to claim 1, wherein said base is U-shaped.

7. The solar lamp battery housing according to claim 1, wherein said cover surrounds the whole of one side of said base.

8. The solar lamp battery housing according to claim 1, further comprising a receptacle disposed on a top of said base, said receptacle having a lateral opening on a side thereof for receiving a said solar lamp post therein, whereby a said solar lamp post traverses said receptacle.

9. The solar lamp battery housing according to claim 8, wherein said receptacle comprises a first and second portion which complementarily engage about a said solar lamp post.

10. The solar lamp battery housing according to claim 1, wherein said base comprises a first and second part each having a cylindrical housing, which when joined together correspond to the cross-section of said base.

11. The solar lamp battery housing according to claim 1, wherein said base includes an integrally formed base plate.

12. The solar lamp battery housing according to claim 2, wherein said base and said cover both comprise a housing receiving at least part of a said solar lamp post, and the joining together of said base and said cover completes said housing for a said solar lamp post.

13. The solar lamp battery housing according to claim 2, wherein said base includes an open bottom.

14. The solar lamp battery housing according to claim 2, further comprising a base plate fastened to a bottom of said base.

15. The solar lamp battery housing according to claim 2, further comprising a receptacle disposed on a top of said base, said receptacle having a lateral opening on a side thereof for receiving a said solar lamp post therein, whereby a said solar lamp post traverses said receptacle.

16. The solar lamp battery housing according to claim 3, wherein said base includes an open bottom.

17. The solar lamp battery housing according to claim 3, further comprising a base plate fastened to a bottom of said base.

18. The solar lamp battery housing according to claim 3, further comprising a receptacle disposed on a top of said base, said receptacle having a lateral opening on a side thereof for receiving a said solar lamp post therein, whereby a said solar lamp post traverses said receptacle.

19. The solar lamp battery housing according to claim 4, further comprising a base plate fastened to a bottom of said base.

20. The solar lamp battery housing according to claim 10, wherein said base includes an integrally formed base plate.

* * * * *